United States Patent
Ellinghaus

(10) Patent No.: US 10,994,868 B2
(45) Date of Patent: May 4, 2021

(54) PANELSAT—STACK ABLE SATELLITE WITH FUEL FREE ATTITUDE CONTROL

(71) Applicant: Frank Werner Ellinghaus, Sinzheim (DE)

(72) Inventor: Frank Werner Ellinghaus, Sinzheim (DE)

( * ) Notice: Subject to any disclaimer, the term of this patent is extended or adjusted under 35 U.S.C. 154(b) by 0 days.

(21) Appl. No.: 15/932,669

(22) Filed: Apr. 5, 2018

(65) Prior Publication Data

US 2018/0257795 A1 Sep. 13, 2018

(30) Foreign Application Priority Data

Oct. 18, 2017 (DE) .......................... 102017009762.3

(51) Int. Cl.
| | | |
|---|---|---|
| *B64G 1/00* | (2006.01) | |
| *B64G 1/10* | (2006.01) | |
| *B64G 1/26* | (2006.01) | |
| *B64G 1/24* | (2006.01) | |
| *B64G 1/34* | (2006.01) | |
| *B64G 1/40* | (2006.01) | |
| *B64G 1/44* | (2006.01) | |
| *B64G 1/64* | (2006.01) | |

(52) U.S. Cl.
CPC .............. *B64G 1/244* (2019.05); *B64G 1/00* (2013.01); *B64G 1/002* (2013.01); *B64G 1/26* (2013.01); *B64G 1/34* (2013.01); *B64G 1/407* (2013.01); *B64G 1/44* (2013.01); *B64G 1/443* (2013.01); *B64G 1/641* (2013.01); *B64G 1/10* (2013.01); *B64G 2001/643* (2013.01)

(58) Field of Classification Search
CPC . B64G 1/00; B64G 1/002; B64G 1/10; B64G 1/244; B64G 1/26; B64G 1/34; B64G 1/407; B64G 1/44; B64G 1/443; B64G 1/641; B64G 2001/643
USPC ........................................................ 244/159.5
See application file for complete search history.

(56) References Cited

U.S. PATENT DOCUMENTS

| | | | | |
|---|---|---|---|---|
| 5,296,044 A * | 3/1994 | Harvey | ................... | H02S 30/20 136/245 |
| 8,066,227 B2 * | 11/2011 | Keller | ..................... | H02S 30/20 244/172.7 |
| 8,109,472 B1 * | 2/2012 | Keller | .................... | B64G 1/443 244/172.7 |

(Continued)

FOREIGN PATENT DOCUMENTS

| | | | | |
|---|---|---|---|---|
| DE | 10234902 A1 * | 2/2004 | ............ | B64G 1/405 |
| DE | 102005028378 A1 * | 12/2006 | ............ | B64G 1/005 |
| RU | 2053941 C1 * | 2/1996 | ............ | B64G 1/407 |

*Primary Examiner* — Joshua E Rodden

(57) ABSTRACT

The PanelSat serves to launch one, better several satellites into space, whereby besides unfurling of the thin film solar cell panels off their rolls no further deployment is needed. PanelSats are small agile spacecraft thought especially for observation and communication services in LEO, which are using their thin film solar cell panels for both, harvesting electric energy as well as for fuel less station keeping, steering, pointing and propulsion.
In contrast to conventional satellites with their 3-axis control design, PanelSats are not locked to only 3 axles and can tilt and point into several directions (depending on the number of panels). Besides Roller Reefing for fuel less attitude control PanelSats feature "Soso Steering" (switch on, switch off) which adds even better fuel less agility compared to prior art satellites.

13 Claims, 6 Drawing Sheets

(56) References Cited

U.S. PATENT DOCUMENTS

| | | | | |
|---|---|---|---|---|
| 8,356,774 B1* | 1/2013 | Banik | .................... | B64G 1/222 |
| | | | | 244/159.5 |
| 8,683,755 B1* | 4/2014 | Spence | .................. | B64G 1/222 |
| | | | | 52/108 |
| 8,894,017 B1* | 11/2014 | Baghdasarian | .......... | B64G 1/44 |
| | | | | 244/172.7 |
| 2002/0116877 A1* | 8/2002 | Breitbach | .............. | B64G 1/222 |
| | | | | 52/2.18 |
| 2012/0138749 A1* | 6/2012 | Ellinghaus | ............. | B64G 1/407 |
| | | | | 244/168 |
| 2016/0332752 A1* | 11/2016 | Abrams | ................. | B64G 1/222 |
| 2019/0315497 A1* | 10/2019 | Blomquist | ............. | B64G 1/222 |

\* cited by examiner

PANELSAT—STACKABLE SATELLITE WITH FUEL FREE ATTITUDE CONTROL

REFERENCE TO RELATED APPLICATIONS

This application is based upon and claims the benefit of priority of the co-pending German Patent Application No. 10 2017 009 762.3, filed on Oct. 18, 2017.

Related Applications of the Inventor

DE000010234902B2, DE10204004543B4, DE102005028378B4, DE1020050062841B4, GB00000234345B, U.S. Pat. No. 7,913,953 B2, GB2492879, U.S. Pat. No. 9,150,312 B2

Other Related Applications

U.S. Pat. No. 4,426,052 A, US20020116877A1, US2006001783, US20050274849, US20050103940, U.S. Pat. No. 5,299,764, EP1280228A2, EP0524888A1, WO1990006259A1, RU002101811C1, RU002053941C1

Related Papers

Wie, Murphy et al., "Robust Attitude Control Systems Design for Solar Sail Spacecraft".
Bo Fu et al., Solar Sail Technology, a state of the art review, Jul. 5, 2016.
W. Keats Wilkie et al., Heliogyro Solar Sail Research at NASA IN: Advances in Solar Sailing pp 631-650.
Bong Wie, Space Vehicle Dynamics and Control, 2. Ed.,
Frank Ellinghaus, Solar Sailing and solar power generation by "Roller-Reefing", ISSS 2010, New York, Jul. 20-22, 2010.
Frank Ellinghaus, Solar Sail Power Station, ISSS 2010, New York, presentation, Jul. 22, 2010. (Papers of the inventor can be downloaded at his web site solar-thruster-sailor.info).

BACKGROUND OF THE INVENTION

Field of the Invention

The invention relates to the launch of one or even better, multiple satellite spacecraft (here PanelSats) which am launched in one single liftoff. While the satellites are using solar sail techniques for attitude control, steering and pointing, there is no need for deployment of the thin film solar cell panels. All satellites are placed ready for action in the payload department of the launcher, whereby they are stackwise stowed.

The PanelSat invention relates also to fuelless attitude control by the prior art of "Roller Reefing" combined with a new kind of steering for that kind of satellite, denoted by the inventor as "SoSo-Steering" (switch on, switch off steering) assisted by a novel sensor configuration.

DESCRIPTION OF THE RELATED ART

A state of the art review on solar sail technology is given by Bo Fu, Evan, Sperber and Fundelis, Eke (Jul. 5, 2016). Since Roller Reefing, which is the base of this actual invention, is not taken in, the inventor thinks, that his already mentioned so applications are still state of the art, regarding to the special attitude control technology applied to this innovation.

State of the art seems to be also the HELIOS development, a heliogyro solar sail design by NASA, which uses electric motors fixed to the sailcraft body, to turn the sail blades for pitch control.

The PanelSat uses also such motors (here center turn motors 3.6) on the Central Platform body to turn the panels including their rolls, but in conjunction with Roller Reefing (furling and unfurling) and additional turning of the panel rolls attached to the Outer Ring. This allows simultaneous turns for exact pitch- and as well twisted turns for roll-control of the spacecraft.

In contrast to a heliogyro solar sailcraft the PanelSat does not need constant rotation to cause centrifugal forces, and with them to keep the sail panels in shape, as a HELIOS sailcraft would require.

Rotational forces would make steering and attitude control to difficult. Therefore, the roll control capabilities through windmill forces are rather thought for exact pointing and apart from that to avoid rotation at all.

HELIOS has also photo-voltaic sensors attached to it's blades to allow separate attitude determination of the blades in relation to the attitude of the spacecraft body.

In case of the PanelSat sensors, the exact location on both end caps of the panel roll enables, to determine the accurate switch off state of each panel, when it points with its edge towards sun.

With DE102005028378B4 the inventor has introduced Roller Reefing for solar sail spacecraft. A way to set a solar sail or solar cell panel just by unfurling it off it's sail foil roll. Roller Reefing allows also fuelless attitude control and steering of the spacecraft by furling and unfurling the sail foils on and off their rolls. Furling one of a panel pairs panels, while the other is fully unfurled means, that the center of mass (cm) moves toward the furled side of the spacecraft, while the center of SRP (cp) moves into the opposite direction.

By furling and unfurling the panels just a few centimeters or millimeters the pretty consistent SRP should enable very fine and precise fuel free attitude control and pointing of the spacecraft body.

With DE1020050062841B4, GB000002434345B and U.S. Pat. No. 7,913,953 B2 the inventor has introduced a Solar Sail Launch System whereby a System Mothership Sailcraft is launched and deployed with the help of the System Launcher.

The actual invention features also a System Launcher which launches preferably several solar panel satellites (named PanelSat), but does not need to deploy them. The PanelSat is using Roller Reefing too and looks similar to FIG. 4 of the inventors patent U.S. Ser. No. 00/000, 7913953B2. The panel rolls on the Outer Ring of the craft are similar to FIG. 3.a of the same US application, with the single difference, that instead of two motors located at the panel roll end sides, two sensors are installed there, and only one motor (3.4 or 3.8, FIG. 3)inside and in the middle of the roll is provided, to allow furling and unfurling of the panels. While the prior art Roller Reefing attitude control uses panel rolls at the Outer Ring and winches at the Inner Ring, this new invention is equipped with panel rolls on roll holder on both sides of the panels, at the Outer Ring 1 and at the Central Platform 2 of the PanelSat. The full roll installation is turn able mounted to turn motors (3.3 and 3.6, FIG. 3) for SoSo steering and attitude control on both ends of the panel attachments.

It also features on both ends of the roll installation a novel sensor combination (3.5 and 3.9) attached to the roll holders, which allows to determine the orientation of each panel to point the end caps and with them the edges of each panel towards Sun. As the SRP hits only the panel edges, the pressure force for those sun wards pointing panels is switched off.

While the prior art HELIOS design can turn the panels with it's central core motors too for pitch control, those panels are rather flexible and loose orientated. Selective twisting, as on the PanelSat with both turn motors (3.3 and 3.6, FIG. 3) on both ends of the panels, is for HELIOS not possible.

Compared to a Heliogyros design, bending and torsion deflection is not a problem for PanelSats, because of the rigid panel attachment to both ends of the panel rolls. Hereby a tension of the panel edges brought onto the foil threads through a slight pull of the central panel roll will help, to improve panel edge stiffness even more.

This pull would help also to avoid wrinkles on the foils.

BRIEF SUMMARY OF THE INVENTION

The invention features the PanelSat launch System consisting of PanelSat(s) and the System Launcher Spacecraft. The system's purpose is to launch preferably several PanelSats with one single launch, which are ready for action without the need of further deployment.

The purpose of the PanelSat is the invention of a panel based observation-/communication satellite with excellent propellant free agility and precise pointing of the spacecraft body by the replacement of the conventional 3-axis satellite control system through a multi axle attitude control. Hereby the propellant free Roller Reefing attitude control is improved by the newly introduced SoSo (switch on/switch off) steering and attitude control and further improved through additional thruster assistance about the same roll axles and additional mass moving insides of the columns of the satellite.

As the flexible turn- and roll able satellite panels are made of or coated with thin film solar cell foils they would be used for both—collecting electric energy of the sun, and for fuel free attitude control, steering, pointing and propulsion.

For this reason, the inventor has named the spacecraft "PanelSat".

The satellite is standing on columns, whereby the Outer Ring 1 and the Central Platform 2 are each supported by their own columns to take on the acceleration forces during launch.

Figure 2:
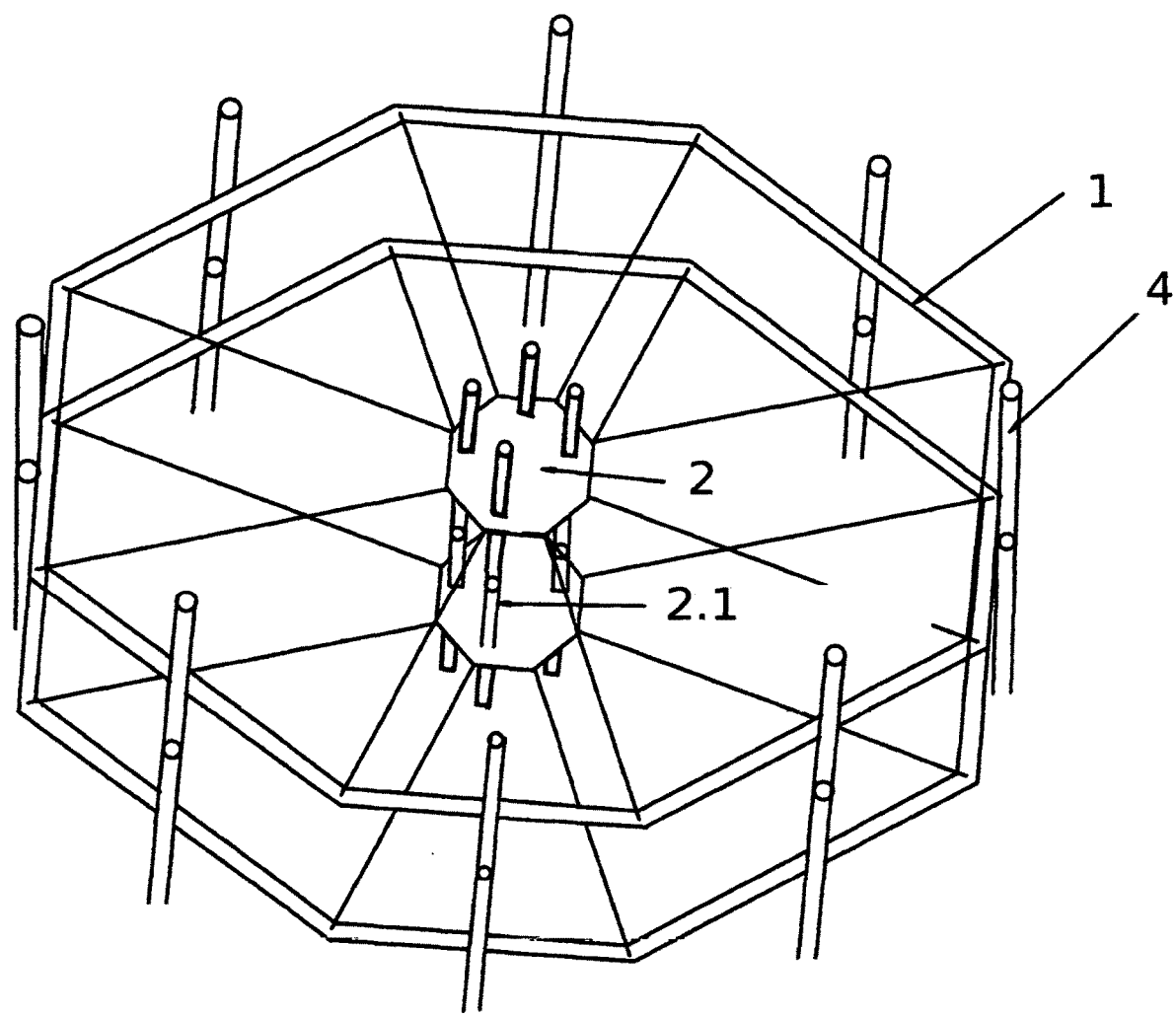

FIG. 2 shows two PanelSat bodies without panel rolls. The upper one is stacked onto the body underneath. The columns, which carry the spacecraft body, are accordingly formed and positioned, to stick into one another and support forming a stack of PanelSats. As they are hollow, they carry also gear and equipment insides their hulls, like thrusters, photo gear, telescopes, lasers, mass shifting devices for attitude control and so on.

Figure 3:
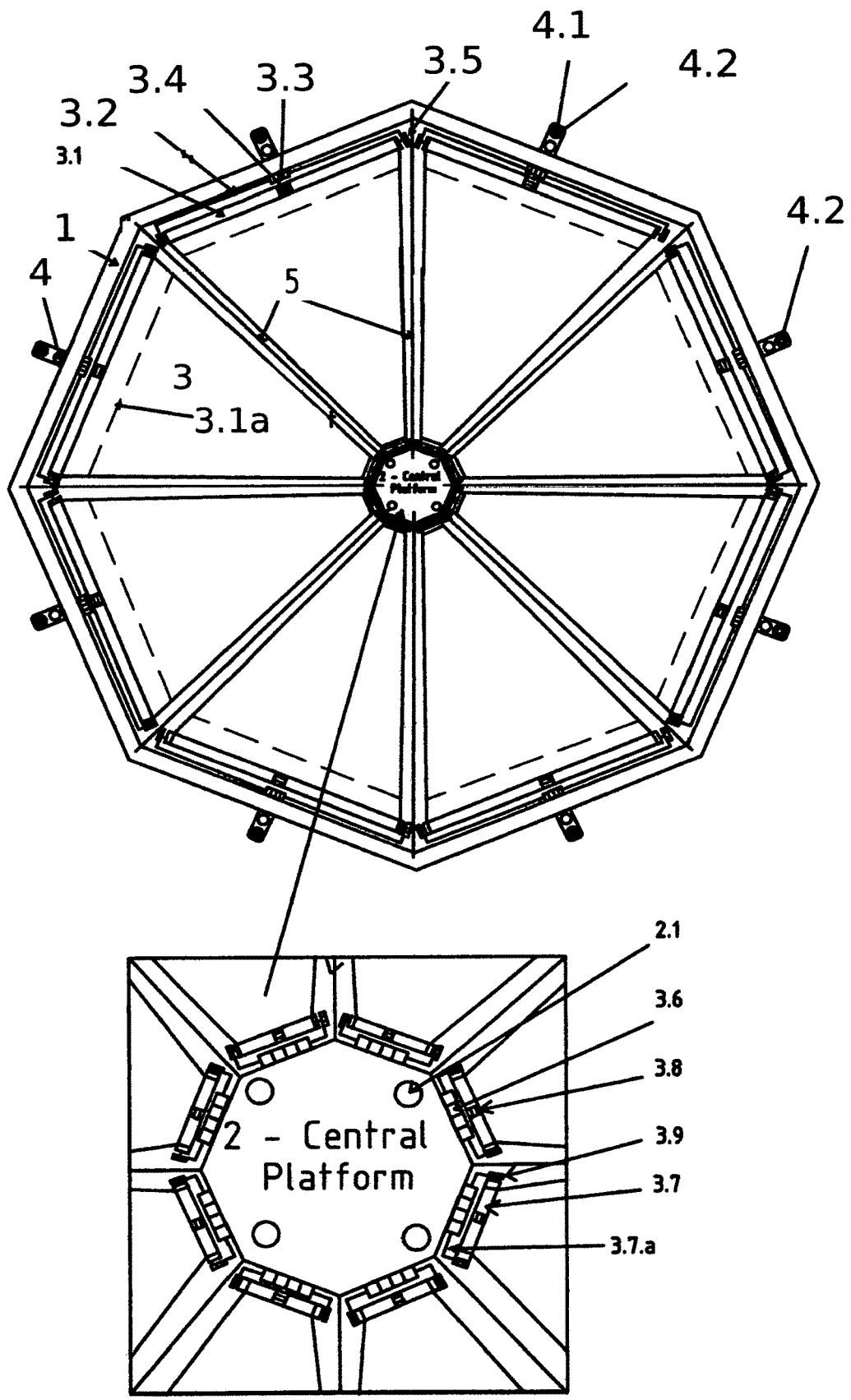

FIG. 3 is the look from above onto a PanelSat with unfurled panels 3.

The Central Platform 2 with the spacecraft bus is in space held by a strut-like structure, or ropes or wires 5 in the center of the Outer Ring 1.

Figure 4:
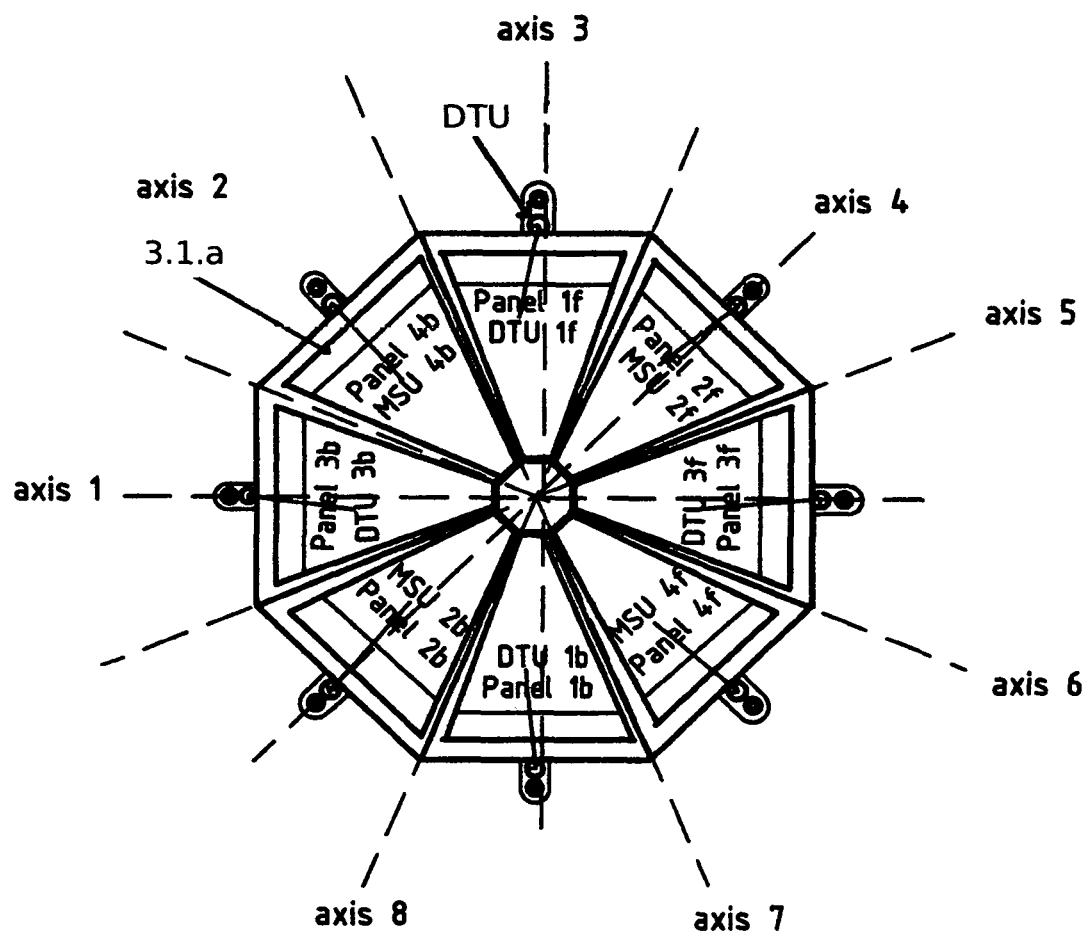

FIG. 4 stands for a PanelSat in octahedron form and it's turning axles. In this preferred case for operation ready, stack launched satellites are eight pitch axles, the satellite is turning about and one roll axis about the center of the spacecrafts plane (by using a windmill constellation of the panels).

Larger PanelSats, especially space mounted ones would use more panels and therefore feature even more pitch axles.

Figure 5:
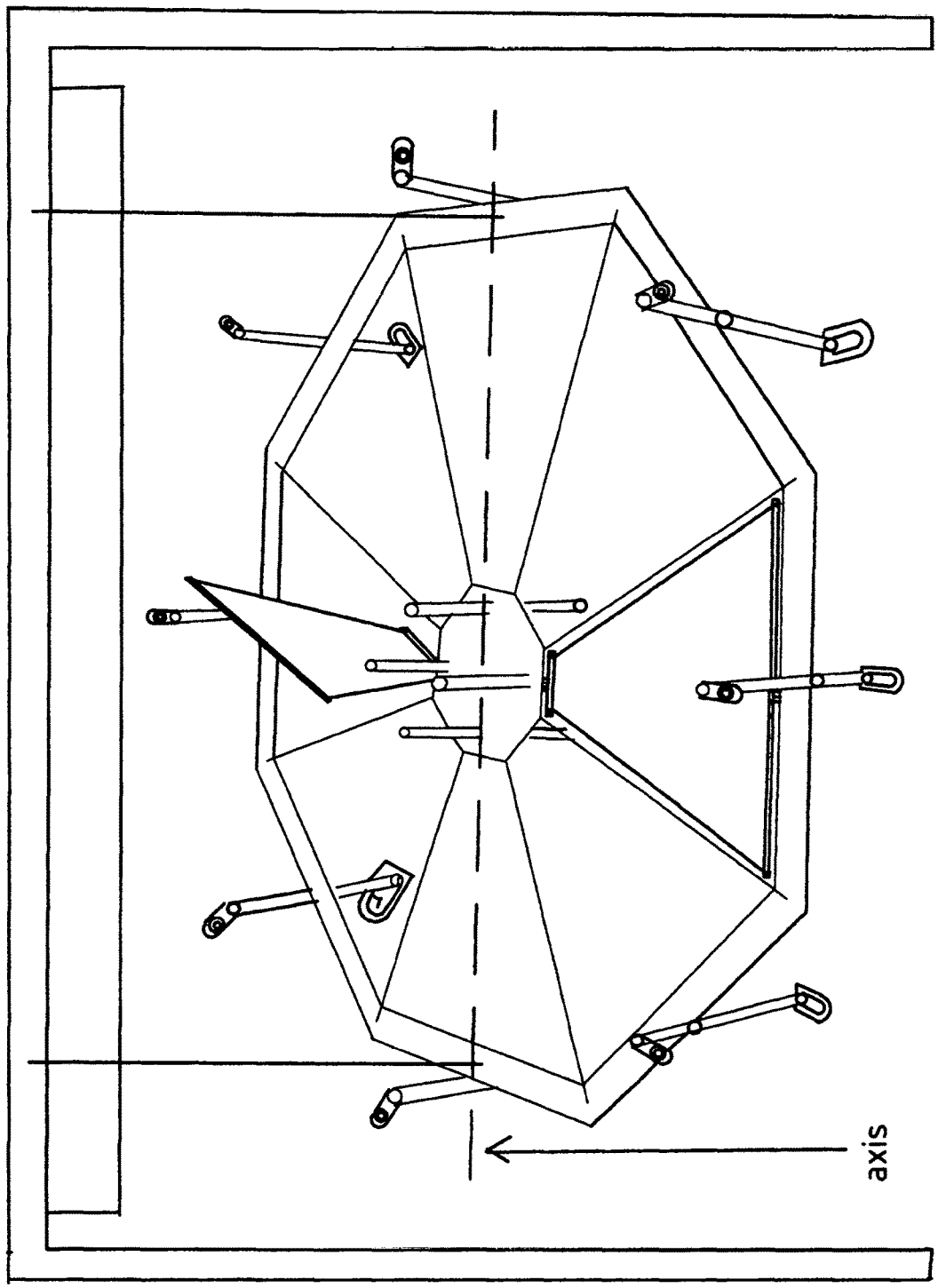

FIG. 5 is a PanelSat installation in a test rig. The PanelSat in the drawing hangs insides of the rig, whereby an air-blower installation delivers a constant and gentle air breeze to test the reaction of the PanelSat when the installed panels are tilted in different positions.

Figure 6:
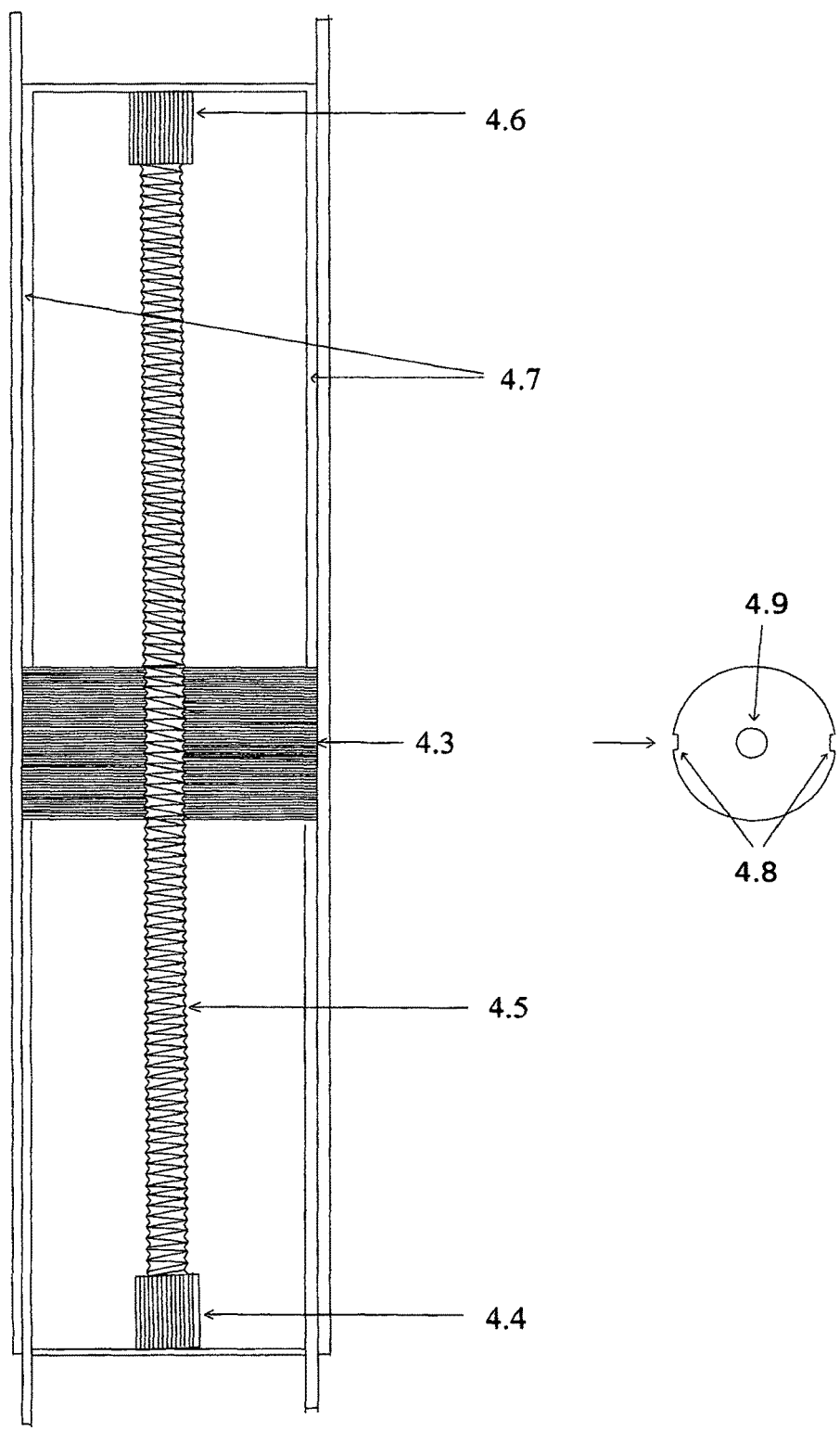

FIG. 6—Mass shifting column 4.*a* —

A further actuation device would be a motor-driven ballast mass to alter the position of the mass center into the third dimension (since the satellite without the central platform has a rather flattish, two dimensional shape).

In this case the ballast mass 4.3 is installed insides of a mass shifting column 4.*a*.

DETAILED DESCRIPTION OF THE INVENTION

The One Web initiative is about to launch and operate initially 648 satellites, later even another 1,972 specimens for communication services in low earth orbit (LEO). SpaceX is considering to launch even 4,000 satellites in approximately for communication and observation, also in LEO. Other than in GEO, where the satellite seems to hover above the same location on Earth, the different sites move under an orbiting satellite in LEO pretty fast.

To deliver communication services to a certain area, or to follow an observation point, frequent changes of the pointing direction is necessary. By using propellant for this frequent tasks, the fuel supply would be soon consumed and the satellite would have to stop operation. Hence, the ability to change the pointing direction without needing propellant, is essential.

The aim of this invention is, to provide such a design of a small, agile satellite, which allows propellant free attitude control, steering and precise pointing and also frequent attitude corrections for observation and communication services.

Another aim is to step away from conventional 3-axis attitude control to a multi-axis system, which allows a more direct, selective pointing strategy.

A further goal is the launch of a stack of satellites in one single launch, which are ready for action and don't need any kind of deployment other than unfurling their panels off their rolls.

This targets are reached with the present patent application.

The PanelSat may use thrusters (double thruster units (DTU) insides of the columns 4, for steering and attitude control and propulsion, but it has also 3 fuel-free options for steering and attitude control through 1. SoSo-steering (switch-of, switch-on) by turning the sail panels;
2. Roller Reefing (furling and unfurling of the panel foils);
3. Mass shifting insides of the columns 4.*a* (FIG. 6).

Basic Layout of the PanelSat, According FIG. 3

The Central Platform 2 and the Outer Ring construction 1 are both in octahedron form and would be connected by rigid struts 5 (larger spacecraft could use tows, ropes or wires as connection out of mass saving reasons), see FIG. 3. Attached to Central Platform and Outer Ring are turn motors 3.3 and 3.6. They allow to turn the panel rolls which carry the panels 3 between each other for attitude control by SoSo steering (switch on, switch off). The panels are made off or covered with solar cells for energy harvesting and are attached to the rolls with conductive threads.

Inside and in the center of the panel rolls, furl motors 3.4 and 3.8 are attached to their panel roll holders 3.2 and 3.7.a, whereby the stator part of the furl motors is attached to the holder and the rotor part to the inside of the roll. The furling option enables Roller Reefing attitude control and pointing.

Attached to the outer edges of the Outer Ring construction 1, are outer columns 4 or 4.a (see FIGS. 1-3 and 6). Those columns take on the load of the Outer Ring and their attached panel rolls 3.1 during launch, whereby the panels 3 are securely furled onto their rolls.

The panels are only fully furled and unfurled once for launch. A rugged furl part 3.1.a of the panel foil 3 allows frequent furling and unfurling of the small furl part for attitude control.

The center columns 2.1 of the Central Platform 2 take on the load of the platform. All columns are stack-able shaped and arranged, to allow stacking one PanelSat onto the other, as shown in FIG. 2.

Besides their stack-ability; the columns can be filled with functional installations like double thruster units (DTU), lasers, cameras, telescopes, mass-displacement devices (see FIG. 6) and so on.

The outside of the center columns 2.1 might serve as mounting for further outside installations, like satellite dishes, or as docking station for other spacecraft with compatible docking devices.

Roller Reefing

Roller Reefing (by furling and unfurling of the panels on and off their rolls) has been described already in former patent applications of the inventor.

It allows to keep the panels securely on their rolls at the Outer Ring of the spacecraft during launch, whereby the launch pressure onto Outer Ring and attachments is taken on by the outer columns 4. In space the panels 3 would be unfurled and roughly stay in this position.

Roller Reefing is also a way for fine tuning and pointing the axis orientation. Only the small furl part 3.a at the outer panel end of the panels 3 would be furled in and out for attitude control and this part would be heavier and made off rugged, but roll-able material, to allow frequent furling and unfurling. If the furl length of part 3.a would be about 20 cm, the maximal cm/cp offset of this method would be a little more than this 20 cm, since the center of mass moves a little bit opposite to the center of pressure when roller reefing happens.

It would be also possible to furl just a few mm, and with this, to enable a very fine positioning, if needed.

SoSo-Steering (Switch-on, Switch Off) Steering

Turning a panel-roll at the Outer Ring 1 and it's partner roll at the Central Platform 2 simultaneously edgewise towards sun will switch off the solar radiation pressure onto the panel between both rolls, while the solar radiation pressure onto the panel on the other side of the satellite pushes this side downwards toward Earth. This makes a new kind of fuelless steering possible, called SoSo-steering (switch on/switch off) by the inventor.

A placement of sensor panels with sensors 4.1 and 4.2 near the ends of the Outer columns and with sensor units 3.5 and 3.9 near both end caps of each panel roll will allow to compare and derive the sun angle of each axis of the spacecraft body with respect to the sun angles of the appendant panel rolls separately.

The solar cell sensors deliver most power (voltage× current), when they are pointed straight towards sun and less power when the sunshine comes in an angle. With this information, the orientation of spacecraft body and panel rolls in relation to the sun in all 4 main axle directions can be determined.

The combination of photo sensors 4.1 with surrounding solar cell sensors 4.2 would allow to assign the sun angle of each photo. The main usage of the solar cell sensors 3.5 is, to evaluate the switch status of the panel.

Turning the panels from "on" status to "off" by a 90° rotation of the panel rolls, is for a low thrust spacecraft just like a short switch. The center of solar radiation pressure (cp) between the two panels of an axle with one panel turned on off, while the other is still on, will move well into the upper half of the "on"-panel. For a 4 m PanelSat, that means a center of pressure (cp) jump of estimated 120 cm, just initiated by a little turn, while the center of mass of this symmetric spacecraft does not change at all. Compared to the maximally about 20 cm/cp-offset realized by Roller Reefing, SoSo-steering is more efficient, whereby Roller Reefing allows finer adjustments.

In his book Space Vehicle Dynamics and Control, $2^{nd}$ Edition, Prof. Bong Wie states, that for a 40 m solar sail spacecraft, a cm/cp-offset of 10 cm is already to excessive for reaction wheel control and consequently spin stabilization or a cm/cp method should be employed for this sailcraft and a fixed sun angle of 35 degree.

When the much smaller PanelSat with it's short 4 m axle length delivers with a little turn of a panel foil a cm/cp offset of estimated 120 cm (although for this axle only), it is apparent, that SoSo steering is a very effective and agile method in turning the spacecraft towards the desired direction away from a sun pointing orientation of the axle. A switch to "off" for a short time and then a change to "on", while the partner panel on the other side of the Central Platform turns off, to stop the initiated rotation of the spacecraft body about the axle, might be sufficient to change the orientation of the satellite as needed.

DTU-Propulsion, Steering and Attitude Control

Besides solar sail propulsion, the inventor has even in his first patent application DE000010234902B2 proposed to use a secondary attitude control system (ACS). in form of double thruster units (DTU) for sailcraft. A DTU is an installation of two opposite mounted thrusters with their propellant in one tube. Two of this tubes mounted opposite to each other to the outer edges of the Outer Ring 1, allow to rotate the spacecraft about the axis in between and stop the rotation by changing the direction to the opposite mounted thruster of the thruster pairs.

It is also possible to propel the spacecraft by using thrusters on the same side (upside or downside) and stop or reverse the movement again by using the opposite thrusters.

In case of the PanelSat those tubes are replaced by the columns 4.

FIG. 4 shows the main axles 1-4 and the ancillary achsles 5-8 of the PanelSat. The DTU's are mounted insides of the columns on both sides of the Outer Ring right on the main axles 1-4. For instance, the units mounted on axis 1 would turn the craft about axis 3, the units mounted on axis 3 would turn about axis 1.

It is to note, that SoSo steering, as well as Roller Reefing, turn about the same axles as the thrusters do. Which other spacecraft design would allow such a smooth changeover from propellant free to thruster steering?

As thrusters used, micro PPT (pulsed plasma thruster) could be a good solution. Prof. Bong Wie has proposed this technology for solar sail applications because of it's inherent simplicity. Those PPT's ionize and accelerate Teflon® pushed to the nozzles by springs. Tanks and complex feeding systems for the Teflon® propellant would not be necessary and slushing of the propellant would not be a problem. However, other micro thruster technologies, like ion thrusters, cold gas thrusters and the like are also possible.

Full Size, Stack-Able PanelSat

The full size PanelSat would be a second generation satellite, which uses as much floor space of the launchers payload department as possible, to provide as much energy as needed for communication bandwidth and observation purposes.

That would mean an axis length between panels of roughly 4 m, and a little more than 10 square meters of panel area.

As the satellite needs solar radiation for attitude control and energy harvesting, it would preferably be injected into an Earth centered, sun-synchronous and shade-free orbit.

That means, the spacecrafts downside would face Earth and the satellite would receive energy and SRP for pointing all the time.

The panels would allow to point the spacecrafts body within certain limits onto the target. The reason, why moving the whole spacecraft body rather than the imaging system is a good choice, is explained by a citation of Prof. Bong Wie in his book Space Vehicle Dynamics and Control:

"The next generation Earth imaging satellites will require rapid rotational agility as well as precision steady-state pointing accuracy for high-resolution images. Rather than sweep a gimbaled imaging system from side to side, the spacecraft body will turn rapidly. Pointing the entire spacecraft body allows the body-fixed imaging system to achieve a higher definition and improves the resolution for its images."

Prof. Wie names Control Moment Gyros (CMG) for agile imaging satellites. This current invention should allow, to get by without CMG's or flywheels at all for agile steering and precision pointing of the satellite body.

The necessary agility is implemented by SoSo steering, the precision pointing by Roller Reefing.

With U.S. Pat. No. 7,913,953 the inventor introduced a Solar-Sail-Launch-System, whereby the main part of the system, a solar-sail-mothership spacecraft would deploy it's telescopic masts with the help of a rotatable platform in the payload department of the launcher.

The present invention introduces a launch system for smaller thin film based agile satellites with extended fuelless steering capability, whereby after launch besides unfurling the power and attitude control foils off their rolls, no further deployment of the satellite(s) is needed.

The simplest version of the system would be a small precursor satellite, which is brought into space for testing and further development with a shuttle launcher, whereby at launch it is already fully functionally stored inside of the launcher payload department/payload bay and after launch manually brought out into space by astronauts or with the help of a robotic arm. It is thought as a low cost proof of concept model.

The system satellite would feature a size, which just fits through the airlock/port/hatch of the launcher (shuttle).

This allows low budget testing and further development of the architecture through learning by doing.

How is it Possible to Launch a PanelSat in a Fully Extended State?

Figure 1:
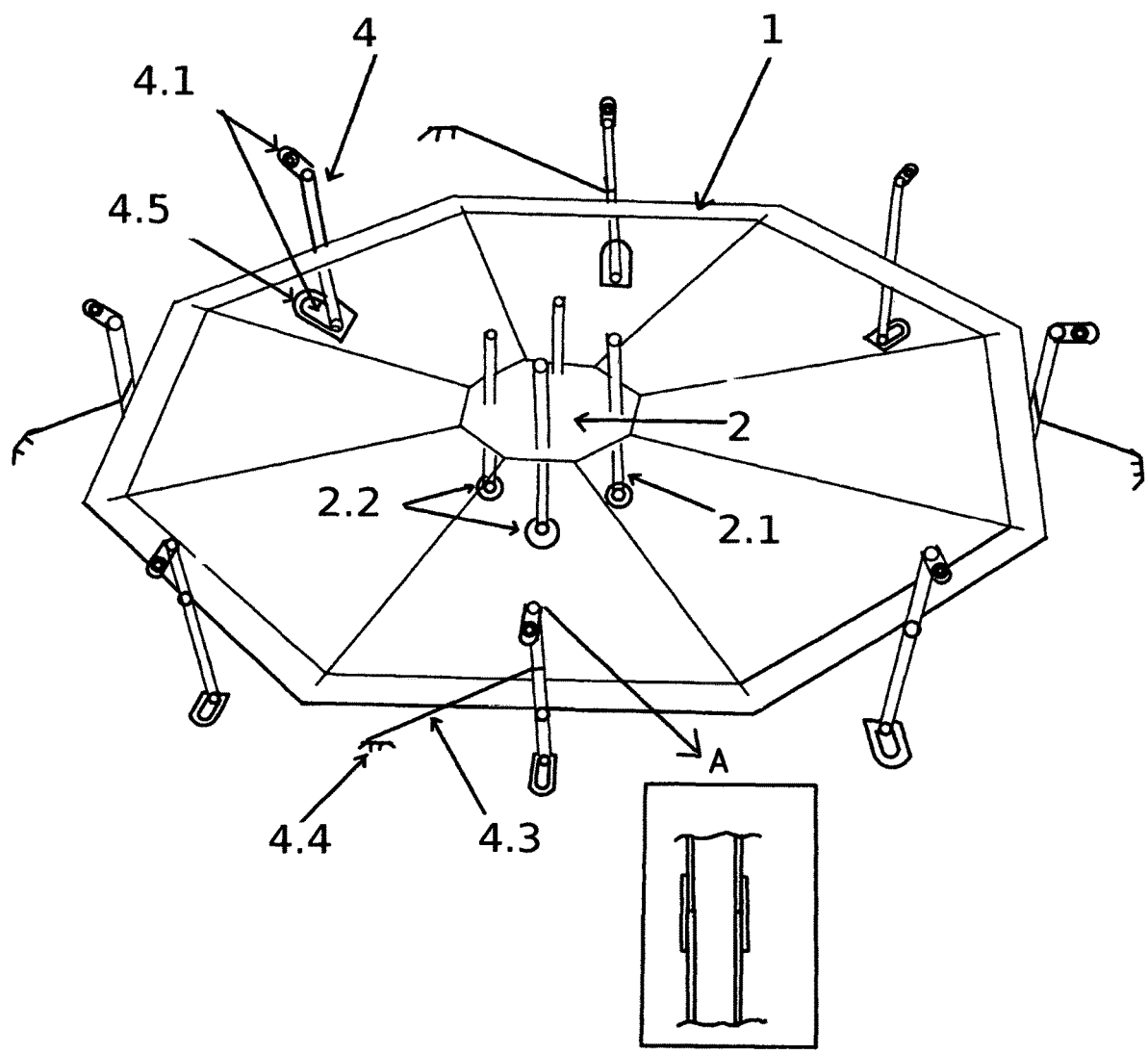
FIG. 1 is a perspective view on a PanelSat without panels and panel rolls.

The main idea how to launch a PanelSat in fully extended state is shown in FIG. 1. The spacecrafts main structural components are the Outer Ring 1 and the Central Platform 2. The main masses belong to or are fixed to Outer Ring and Central Platform.

The acceleration strains during launch are taken separately by the center columns 2.1 for the Central Platform and by the outer columns 4 for the Outer Ring and it's appendages.

That means, Central Platform and Outer Ring are supported by their own columns. The panel foils 3 (not shown in FIG. 1) are securely furled onto their panel rolls 3.1 on the Outer Ring during launch, while they just get unfurled when in space.

The only mass between Outer Ring 1 and Central Platform 2 and their appendages during launch are the stiff struts or ropes/lines/wires 5, which hold the Central Platform in the center of the satellite, when operating in space.

The additional mass, by using stiff struts instead of tractive connections could be compensated by the mass savings through not using flywheels or CMG's.

The benefit of the strut connection would be better pointing accuracy.

To hold the PanelSat in place at launch, the bottom sides of the columns are placed and held inside of accordingly shaped shoes 4.2 at the Outer Ring and 2.2 at the center columns 2.1 fixed to the launcher bottom, while the craft is also pressed down by a lever device or simply pulled downwards by ropes or lines, which are fixed on one side to the satellite and on the other side to cleats, clutches or cams at the launcher bottom and/or hull.

In FIG. 1 are ropes or lines 4.3 shown, which strap the satellite to cleats or cams 4.4 at the launcher bottom or hull.

It would also be possible, to stack several PanelSats onto the first one shown in FIG. 1. For this reason, the upper sides of the columns would be a bit wider on the opening than those of the under side of the satellites.

Strapping or pressing would only be needed for the topmost satellite, which would press the others underneath securely onto their bottom fixtures.

A column connection A for 2 stacked columns is shown in FIG. 1. The upper column stands on the lower one, while a mantle on the topmost end of the lower column helps to get a wider opening.

The sensor panels on the columns, which help to steer the spacecraft about the four main axles are mounted a bit underneath the ends of the columns. That way they wouldn't be damaged when stacked together.

Launching from a shuttle or pressurized bay would be the "cheap"-start of the PanelSat implementation. Another target would be the automatic launch of several larger PanelSats stacked into a launcher by using it's full payload department only for those satellites. The Ariane V launcher with more than 4 meters diameter should allow a stack of PanelSats, with a length of about 4 m diameter between two opposite sides of the octagonal Outer Ring. This should allow at least 10 square meters of panels for energy conversion, fuelless steering, pointing and attitude control on every satellite.

FIG. 2 shows two PanelSat bodies without panel rolls. The upper one is stacked onto the body underneath. The columns, which carry the spacecraft body, are accordingly formed to stick into one another and support forming a stack of PanelSats.

As they are hollow, they carry also gear and equipment insides their hulls, like thrusters, photo gear, telescopes, lasers and so on.

To put the satellites into space, the launcher features a lift device, which raises the whole stack step by step through an opening, which originates from lifting and tilting the tip of the launcher away through a mechanic fixture.

Two robotic arms would be located at the opening. One holds the stack under the uppermost satellite, the other grips under the satellite directly at the opening and pushes it gently into space, where it unfurls it's panels and starts to operate or uses it's thrusters to reach the service orbit without unfurling.

This goes as long until the whole stack of satellites is operating.

Preferred Embodiment of a Panelsat

Near-Time-Version

The preferred embodiment of a near time PanelSat version is shown in FIGS. 1-3, with 8 panels and 8 columns attached to the Outer Ring and 4 columns on the top and 4 columns on the bottom side, supporting the Central Platform. However it depends on the state of development- and the size of the spacecraft. Larger space mounted craft would possess more panels and consequently with increasing amount, feature more turning axles, similar to the development from 8 Bit to 64 Bit computers.

Early proof of concept versions would use different actuators and thrusters, later versions only those with proven success and those fitting best for the intended purpose.

Improved Full Size Launch Version

This version would be built on the NEAR-TIME precursor experience, be launched in its own launcher and use as much of the launchers payload department floor space area as possible, to allow as much solar cell and panel area as possible.

Preferred First Time Embodiment

The first time model in its precursor and improved full size launch variation would use 8 turn-axles shown in FIG. 4 and one roll-axis about the center of the PanelSat plane by a windmill constellation through panel twisting, when those are not turned in step. Instead of 3-axis control a propellant free 9-axis attitude control system with SoSo steering for agility and Roller Reefing for fine tuning of attitude and pointing is available the first time, as shown and explained under FIG. 4. The column pairs located straight line on the 4 main axles 1-4 would be equipped with double thruster units (DTU) on axles 1 and 3 and mass shifting units (MSU) on axles 2 and 4 as shown and explained under FIGS. 4 and 6.

Firing the bottom thruster on one side and the upside thruster of those units at the other side of the spacecraft would turn it around the axis in between, which in this case would be one of the main axles. Roller Reefing or SoSo-steering would push ABOUT THE SAME AXLES and therefore allows to combine or compensate fuel-free steering with thruster steering and attitude control smoothly. When needed, for instance in the shade of Earth or planets or when it is necessary, to propel the craft onto another location, those thrusters can be used for propulsion too.

The Central Platform would be an octagonal prism, just like the body of the famous TUE observation satellite, but without the large telescope of IUE.

Instead of the telescope, 4 center columns 2.1 are attached to the bottom and 4 columns to the top of the octagon.

Those columns could be fitted insides with optics and thermal arrangements to keep the temperature limits for cameras, radio transmitting electronics, laser installations, for observation and communication, measuring instruments and so on.

The Outer body of those central columns could be used as antenna and also as framework for further installations like dishes, or as a docking station for other satellites or thruster units.

At the bottom columns one dish would be attached (looking towards Earth) and four dishes to the topside columns looking side wards for communication and as a relay to sister PanelSats in the same orbit. That way, the time lag for communication with the other side of Earth could be shortened substantially, since a relay with a GEO-satellite would need to cover a much longer distance.

The main purpose of the preferred first time embodiment is flight proof and practice of this nine axis PanelSat and developing control laws and optimal control software, especially for attitude control and pointing.

The experience gained would not only apply to this PanelSat development, but to larger solar sail based space vehicles too.

Vision for Further Usage of Roller Reefing and SoSo Steering

Yet a further goal of this invention is to design a precursor model for further solar sail based usage in future developments. This could be:
1. large, space mounted solar sail spacecraft.
2. even larger solar sail based, square-km sized power stations for energy collection and transmission, whereby Roller Reefing, SoSo-steering and mass shifting by MSU-devices might be good candidates for accurate beam control of the transmitter.
3. yet even larger space habitats with km-sized solar sail flight and energy harvesting panel surroundings, based on Roller-Reefing and SoSo-steering techniques around the core space habitat corpus.

A solar sail spacecraft is thought for space travel and uses reflecting panels to nearly double the propulsion force by reflection. The reflection allows also to "tack" the sailcraft towards Sun.

Since the PanelSat, which is thought for LEO missions in a fixed orbit, doesn't need fuel free propulsion or tacking, it would use non or low reflecting panels to allow a simpler steering strategy.

With respect to this, the PanelSat is no solar sail spacecraft, but an opportunity to prove and verify solar sailing strategies with a short time lag and under much lower costs in a LEO environment.

While non-reflecting panels for the first application as a LEO-satellite for Earth observation and communication are preferred, it is also possible, to install reflecting areas towards the outer ends of the PanelSat foil panels.

This would enable to build a PanelSat as a precursor of a solar sail spacecraft, favored by the experience gained with the low price LEO versions.

DETAILED DESCRIPTION OF THE DRAWINGS

FIG. 1 is a perspective view on a PanelSat without panels and panel rolls.

The satellite is standing on columns, whereby the Outer Ring 1 and the Central Platform 2 are each supported by their own columns to take on the acceleration forces while the satellite is launched.

During launch the mass of the satellite is concentrated at the central platform and the Outer Ring while the panels 3 are furled onto the panel foil rolls 3.1 at the Outer Ring. In space the foils are unfurled.

FIG. 2 shows two PanelSat bodies without panel rolls. The upper one is stacked onto the body underneath. The columns, which carry the spacecraft body, are accordingly formed and positioned, to stick into one another and support having a stack of PanelSats. As the columns are hollow, they carry also gear and equipment insides their hulls, like thrusters, photo/camera gear, telescopes, lasers and so on.

FIG. 3 is the look from above onto a PanelSat with unfurled panels 3.

The Central Platform 2 with the spacecraft bus is in space held by a strut-like structure, or ropes or wires 5 in the center of the Outer Ring 1.

The central platform 2, as shown in the case under the main drawing, could be just a plate with bus and hardware on and underneath, or a full fledged encased satellite bus, which should carry micro-controllers, accumulators or capacitor batteries for energy-storage and on their edges the center panel rolls 3.7 with their roll- and furl-motors 3.6 and 3.8.

The center columns 2.1 take on the load of the central platform during launch, while it is held in space in the Outer Ring by struts, or ropes or wires 5.

The central columns on both sides of the central platform 2 may also be used as docking station for daughter units or as an outside mounting framework for dishes, telescopes, antennas, lasers and other gear.

FIG. 4 stands for a PanelSat in octahedron form and it's turning axles. In this preferred design for operation ready, stack launched satellites, there are eight axles, the satellite is turning about.

Larger PanelSats, especially space mounted ones would use more panels and therefore feature even more axles.

In the drawing the main axles 1-4, which touch the sensor panels, columns and center longitude line of the panel foils, are defined and arranged clockwise.

Starting with axle 1, which touches the 9 o'clock and 3 o'clock positions, a viewer looks forward to the actuators and sensor panel at 12 o'clock. Those are in front (status "f") of him, while actuators and sensor panels at 6 o'clock are behind (status "b") him. The actuators are named after the numbers of the axles, they are turning about, not after those axles, they are on.

The viewer turns clockwise onto the main axle positions until he has reached axis 4 and looks forward to actors and sensors at thirty past one, while the actuators and sensors of panel at thirty past seven are behind of him.

That way it is defined, which of the actuators are front- and which are behind-actuators in a two-dimensional way of view.

From his position on axis 4 towards thirty past one, the viewer does a half turn of 45 minutes to carry on his clock ward rotation to reach axis 5, which is an auxiliary axis.

The auxiliary axles 5-8 lie between the main axles, starting with axle 5 at past 2, up to six forty-five for axis 8.

With the additional definition, that downside (d) is the spacecraft side under the body plane (looking towards Earth for an earth orbiting satellite) and top side(t) is the side above, it is possible to name each thruster or position of the panels or sliding masses in an explicit way.

All main axles in this PanelSat design go through the middle of their panel rolls, the middle of their actor columns and of their sensors 4.1 and 4.4 at the Outer ring and their sensors 3.5 and 3.9 at the end caps of their panel rolls, when they are tilted 90° to the spacecraft body.

In the preferred first time embodiment of the PanelSat, the columns on both sides of the Outer Ring on axles 1 and 3 carry double thruster (DTU) installations, while the 4 columns of axles 2 and 4 are equipped with mass shifting units (MSU) as shown in FIG. 6.

That way, axles 1 and 3 would resemble a conventional 3 axis control for thruster propulsion, but with the possibility, to chose between Roller Reefing, SoSo-steering or thruster steering at this axles, or even combine two or all of this possibilities.

Axles 2 and 4 would also resemble a 3-axis control, but feature instead of the thruster option, mass shifting.

If the mass shifting experiment does not fulfill the expectations or does not help at all, to enhance the agility of the spacecraft, the following PanelSat version could drop the MSU-columns and install double thruster units instead.

In this case the next model would use besides panel steering, for thruster-only propulsion a 4+1 axis control for the thrusters.

Besides using only one single axis at a time for attitude control, the next step is the combination of 2, 3 or 4 axles with all their actuation devices.

While the actuators on axis 1 turn about axis 3, the same actuators used together the same time on axles 2 and 4, turn also about axis 3, as well as axles 1, 2 and 4 move about axle 3 too.

The auxiliary axles 5-8 have no own actuation devices, as the main axle 1-4 do. But as they are arranged between two or four main axles, such a combination could be used also as virtual actuation axles. For instance auxiliary axis 5 lies between main axles 4 and 1 and also between combined axles 4,1,3,2.

The combination of the virtual actuation devices on axle 5 by using the devices of main axles 4 and 1 together at the same time would turn about auxiliary axis 7. Using the actuation on all main axles 1-4, around the virtual actuation axle 5, two on one side of axis 5, two on the other side, would also turn about the auxiliary turn axis 7.

It is not the agenda of this patent application, to develop the fitting steering law for PanelSat attitude control. This would be subject for the work of physical- and computer-scientists. But it would be advisable, to use a common language, which distinguishes between main and virtual axles, actuation- and turn-axles, and shows distinctive, which of the actuators of each axle and in which combination are used. This should be done in relation to a defined two dimensional view onto the spacecraft plane, as shown in FIG. 4 and also in relation to the third dimension—up- or downside of the spacecraft body.

FIG. 5 is a PanelSat installation in a test rig. The PanelSat in the drawing hangs insides of the rig, whereby an air blower installation delivers a constant and gentle air breeze to test the reaction of the PanelSat when the installed panels are tilted in different positions.

While the airflow would be a much stronger force than the SRP acting onto the satellite in space, the center of airflow pressure should be on the same locations as the center of SRP, when the panels move, if the PanelSat in space uses no reflecting panels. Such a test constellation should allow conclusions about the real spacecraft behavior, when in action.

In this drawing the satellite body is fixed with two suspensions at the spacecraft turning axis to the rig. That would allow to measure the reaction of the spacecraft body on movements about this very single axis.

A further variation of the test rig would be the fully furnished PanelSat which carries all of its panels and uses all of its axles, whereby the satellite body is held by only one suspension in the center, whereby it is balanced and pointed by SoSo and Roller Reefing steering.

Yet an additional test rig variation is a smaller precursor model with rig and satellite inside a vacuum chamber on Earth or even better at the ISS and—instead of the air blower the installation of a light source, which delivers an equivalent to the solar radiation pressure.

This constellation would allow testing of panel variations with reflecting parts of the panels towards the Outer Ring for future solar sail spacecraft, which use their panels fort acceleration and propulsion too.

FIG. 6—Mass shifting column 4.*a* with a mass shifting unit (MSU) installation—A further actuation device would be a motor driven ballast mass to alter the position of the mass center into the third dimension (since the satellite without the central platform has a rather flattish, two dimensional shape).

In this case the ballast mass 4.3 is installed insides of a mass shifting column 4.*a*.

The mass 4.3 is shifted by a threaded shaft, fixed attached to and driven by a motor 4.4 at the bottom of the shifting column. The guiding rails 4.7 and guiding notches 4.8 hold and guide the mass at the sides for sliding up- or downwards. This would allow, to explore the impact of the gravity gradient in the LEO environment onto the spacecraft.

The gravity of Earth decreases with an inverse square law. The lower parts of a spacecraft will be more attracted as the higher parts and so would the shifting mass on the MSU-bottom be more attracted towards Earth as the mass on the high end of the MSU. By lifting the MSU mass on one side of the axis and get it down to the bottom of the partner mass on the other main axis side of the satellite, the whole side with the bottom mass would be more attracted.

Assumed, the difference between the sliding masses would be about 1 m, that seems to be too sparse, but as the columns are attached to opposites sides of the spacecraft body, the lever for the small force pulling the body of the spacecraft towards the side of the lower mass down towards Earth, would be considerable.

Having PanelSats as observation or communication satellites in regularly applications in LEO would not only be a help for this services, it would also enhance the knowledge about fuel free attitude control of satellite and solar sail behavior in space substantially.

LIST OF TERMS, ABBREVIATIONS AND REFERENCE SIGNS

Roller Reefing—by furling and unfurling of the panel foils, center of mass (cm) and center of solar radiation pressure (cp) are changed for steering and attitude control. Possible cm/cp offset of mm, up to about 20 cm, for sensitive and exact steering and pointing.

SoSo-steering—(switch on/switch off) for agile moves by tilting one of two axis-panels edgewise towards sun. For agile turns with a cm/cp offset of about 120 cm.

DTU=double thruster unit
MSU=mass switching unit
cm=center of mass-displacement
cp=center of solar radiation pressure
SRP=solar radiation pressure
ACS=attitude control system
sa=single axis
da=double axis
ta=triple axis
qa=quad axis
f=front=in front of viewer
b=behind=behind of viewer
t=top side=above spacecraft
d=downside=under the spacecraft plane
RR=Roller Reefing by furling/unfurling
SS=SoSo-steering (switch on/switch off)
MS=mass shifting
TH=thrust by firing thrusters
1=Outer Ring
2=Central Platform
2.1=center column
2.2=center column shoe
3=panel foil
3.1=panel roll
3.1.*a*=furl part of panel foil
3.2=panel roll holder
3.3=outer turnmotor
3.4=outer furlmotor
3.5=outer panel-roll sensor unit
3.6=center-turnmotor
3.7=center panel-roll
3.8=center furlmotor
3.9=center roll-sensor-unit
4=outer column
4.1=foto sensor
4.2=solar-cell sensor
4.3=sensor panel shoe
4.4=mounting cleat or cam
4.5=solar-cell-sensor

SUMMARY OF THE INVENTION

PanelSat, an agile Satellite for observation and communication services is introduced, which uses extensively propellant free steering, attitude control and pointing technology. Additional to this primary propellant free attitude control system (ACS) a secondary thruster ACS and propulsion is well integrated to the satellite. As the solar cell panels serve, to move the center of mass (cm) and the center of solar radiation pressure (cp) with respect to each other, to steer the spacecraft, as well as they are harvesting energy, this satellite has be named "PanelSat". The newly introduced SoSo-steering technology allows an cm/cp offset jump of about 120 cm for a 4 m satellite, while Roller-Reefing allows an cm/cp offset in the range of mm up to 20 cm for finer steering and pointing.

In addition, the commonly used 3-axis attitude control has been replaced for the presented design by an ACS about 1 roll and 8 pitch axles, whereby the thrusters of the spacecraft are in a way arranged, to push about the same axles as the panels, if solar radiation pressure (SRP) is not available.

Even though the full sized PanelSat carries about 10 m² of panel foils, there is no need of deployment after launch.

The satellite just unfurls the panels off their rolls, when in space.

To allow exact and separate attitude determination for both, the spacecraft bus and the panel orientation towards sun, the spacecraft is equipped with sensors for all axles and panels.

Further important construction elements of the PanelSat are the columns, both on the Central Platform body and on the outer edges of the spacecraft.

They serve as support for the Central Platform body and for the Outer Ring construction, where the sensitive panels are securely stored furled onto their rolls during launch. The columns allow also, to stick one PanelSat on top of the other. This allows the launch of several satellites in a stack.

The invention claimed is:

1. A PanelSat comprising:
a central platform body with spacecraft bus, an outer ring, multiple pairs of rollable panel foils, whereby each panel foil of a respective one of the pairs of rollable panel foils are located diagonally opposite of each other on opposite sides of the central platform body, whereby each panel foil of each of the multiple pairs of rollable panel foils is attached to two motor driven and turnable panel rolls, whereby one of the two panel rolls is attached to the central platform body, while another panel roll of the two panel rolls is attached to the outer ring;
a plurality of hollow columns attached to an outside edge of said outer ring to support the outer ring against launch stresses, whereby said central platform body and the outer ring are self-supporting against launch stresses, whereby each of the hollow columns is plugable formed and configured to allow each of the columns of the PanelSat to be stacked with at least one additional PanelSat, whereby the PanelSat is capable of being stacked with one or a plurality of the at least one additional PanelSat;
whereby the PanelSat when stacked with the at least one additional PanelSat is configured to be built inside a launch spacecraft by plugging the columns of an uppermost one of the PanelSats of the PanelSat or the at least one additional PanelSat into the columns of the lowermost one of the PanelSats of the PanelSat or the at least one additional PanelSat and plugging undermost ends of the hollow columns of the lowermost one of the PanelSats of the PanelSat or the at least one additional PanelSat into column shoes, which are attached to the launch spacecraft;
whereby said panel foils are configured to be furled onto the panel rolls of the outer ring during launch, while the PanelSat is configured to unfurl the panel rolls on the outer ring for energy harvesting and propellant free attitude control and pointing when the PanelSat is in space.

2. The PanelSat according to claim 1, whereby a plurality of additional hollow columns are attached to the central platform body which are configured to be plug and stackable to support the platform against launch stresses and for stacking with the at least one additional PanelSat.

3. A PanelSat comprising:
a central platform body with spacecraft bus, an outer ring, a plurality of hollow columns respectively attached to the central platform body and the outer ring, a plurality of furl-motors, a plurality of turn-motors, a plurality of rollable panel foils each attached on both ends to a respective motor driven and turn-able and tilt-able panel roll with each of the panel rolls connected to a respective one of the furl-motors and turn-motors and a respective one of the central platform body and the outer ring, to furl and unfurl the panel foils on and off the respective panel rolls at the outer ring, whereby one of the turn-motors of each respective panel foil is attached to the outer ring and another one of the turn-motors of the respective panel foil is attached to an outer edge of the central platform body, whereby said outer ring and said central platform body each are shaped at outer edges as an even numbered, equiangular and equilateral polygon, whereby an inside shape of the outer ring is an equiangular and equilateral polygon, whereby the turn-motors to turn the panel rolls and the panel foils are attached to a middle of polygonal sides of the equilateral polygon of the respective central platform body and the outer ring;
a plurality of solar cell sensors are attached to end caps of the panel rolls, the solar cell sensors are attached to measure resulting power and with it a direction of a sun in relation to each of the panel rolls and by simultaneously tilting both of the panel rolls of a respective one of the panel foils, a panel edge of the respective one of the panel foils with regards to the sun to switch off the solar radiation pressure onto the respective one of the foil panels, whereby the turn-motors turn the respective panel foil;
whereby the plurality of foil panels form a plurality of pairs of foil panels, each pair of foil panels are pairwise situated, straight opposite of each other on opposite sides of the central platform body, to establish a common axis, which allows to tilt and/or push the PanelSat into a direction of a not or less tilted one of the panel foils, while another one of the panel foils is tilted edge on to the Sun, thereby enabling propellant free steering.

4. The PanelSat according to claim 3, configured to operate using propellant free Roller reefing steering, whereby by furling respective ones of the panel foils on or unfurling the respective ones of the panel foils off the respective panel rolls on the outer ring, a center of mass and a center of solar radiation pressure are moved into opposite directions to each other by furling the panel foils on and unfurling the panel foils off the respective panel rolls on the outer ring.

5. The PanelSat according to claim 4, whereby insides of the hollow columns are functional fixtures and configured to support instruments.

6. The PanelSat with according to claim 5, whereby the insides of said hollow columns contain double thruster units including propellant, whereby each double thruster unit features two opposite mounted thrusters, one thruster pointing downsides and another thruster pointing upsides of a PanelSat plane, which propel into opposite directions out of the hollow columns.

7. The PanelSat according to claim 6, configured to operate using double thruster propulsion and steering, whereby each of the hollow columns having the double thruster unit are attached to the middle of the polygonal sides of the equilateral polygon of the respective central platform body and the outer ring, each of the double thruster units forms a pair of double thruster units with a diagonally located one of the double thruster units, whereby firing the one thruster pointing downsides on one side of the spacecraft of the pair of double thruster units, while firing the another thruster pointing upsides of the opposite double thruster unit of the pair of double thruster units, allows to turn the PanelSat about a same turn-achsle, the respective panel foils located adjacent the pair of double thruster units being capable of simultaneous movement.

8. The PanelSat according to claim 7, whereby near both ends of the hollow columns of the outer ring are sensor panels with solar cell sensors for sensing an orientation of the respective hollow column, each of the sensor panels of a respective one of the hollow columns and a sensor panel of a corresponding one of the hollow columns located on an opposite side of the PanelSat from the respective one of the hollow columns are configured to determine an orientation of a turning axle between any two of diagonally located ones of the panel foils in relation to the sun, whereby the turning axle for every two of the diagonally located ones of the panel foils are configured to be determined for finding the orientation of the PanelSat, whereby the orientation of the panel foils in respect to the sun and in respect to the PanelSat is separately determined by the solar cell sensors on both of the end caps of the panel rolls and by the sensor panels attached to the PanelSat.

9. The PanelSat according to claim 8, whereby laser units are installed on the insides of at least one of the hollow columns.

10. The PanelSat according to claim 9, whereby photo sensors are installed the insides of at least one of the hollow columns.

11. The PanelSat according to claim 10, whereby a moveable mass is installed on the insides of at least two of the hollow columns, which are placed on opposite sides of a plane of the PanelSat at the outer ring, whereby by simultaneously changing a position of said masses into a same direction above or under the plane of the PanelSat, a mass center of the PanelSat is placed above or under the plane of the PanelSat, whereby by simultaneously switching positions of said masses from a central orientation into opposite directions, because of a gravity gradient in an LEO environment, gravity will pull a lower mass of the masses stronger towards earth and will pull a respective end of the hollow column with the lower mass towards earth about an axis between the at least two of the columns each having the respective moveable mass, whereby a vertical mass displacement of said masses is configured to be used to control an inclination of the plane of the PanelSat towards Earth.

12. The PanelSat according to claim 11, whereby each said mass has a threaded hole, whereby on insides of the threaded hole is a threaded rod, which is turnably held by and fixed to a motor inside of one frame near one end of the respective column, while the rod is held by another frame near another end of the respective column, whereby the mass has at least one guiding notch and the respective column has at least one guiding rail, which avoids the mass from spinning, when the rod is turned, whereby by turning the threaded rod on the motor, the vertical location of said mass and with it the center of mass of the PanelSat plane is changed.

13. The PanelSat according to claim 3, whereby a photo sensor and a solar cell sensor is attached near both ends of the hollow columns of the outer Ring, whereby the photo sensor is located in a middle of the solar cell sensor.

* * * * *